UNITED STATES PATENT OFFICE.

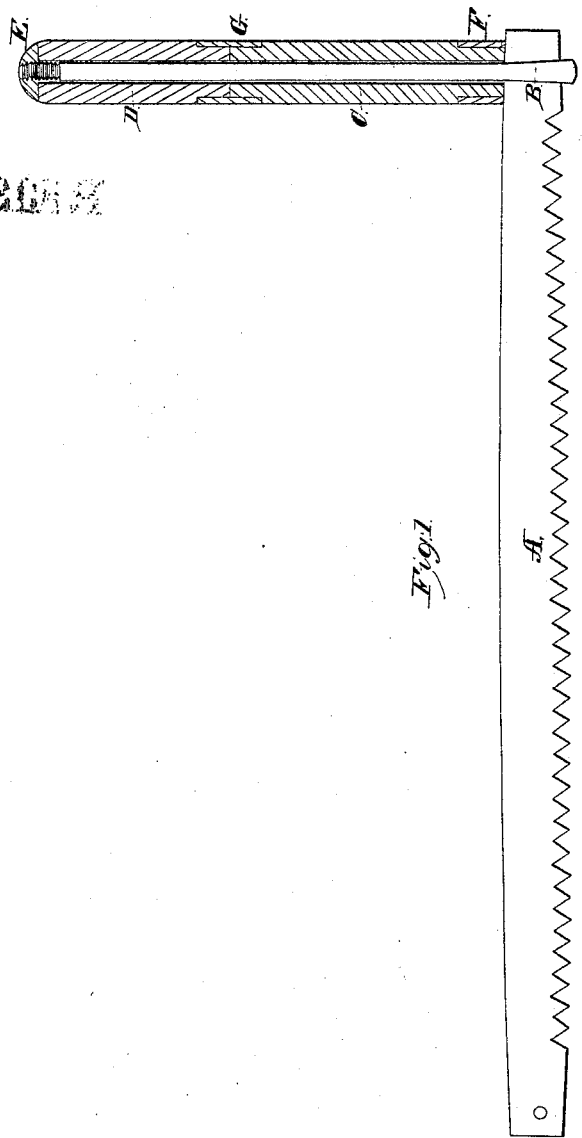
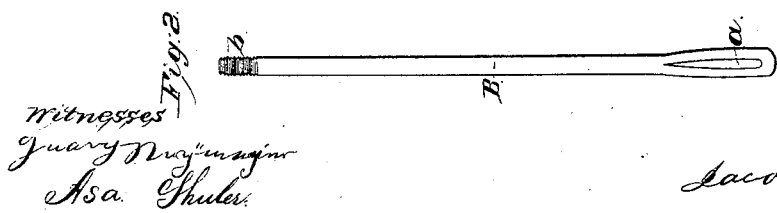

JACOB NEIMEYER, OF HAMILTON, OHIO.

FASTENING SAW-HANDLES.

Specification forming part of Letters Patent No. 27,303, dated February 28, 1860; Reissued February 27, 1877, No. 7,543.

*To all whom it may concern:*

Be it known that I, JACOB NEIMEYER, of Hamilton, in the county of Butler and State of Ohio, have invented a new and useful Improvement in the Handles of Crosscut-Saws; and I do hereby declare the following to be a correct description of the same, reference being had to the accompanying drawings, making part of this specification, in which—

Figure 1 is a side elevation of a crosscut saw with my improved handle applied, the handle being shown in section; Fig. 2 is an end view of the slotted rod which passes through the handle.

The nature of my invention consists in providing the cross cut saw with a handle that holds with the necessary firmness when it is attached, and yet is easily and instantly removable whenever its removal is required, said handle being constructed as hereinafter more particularly set forth.

In the drawings A marks the blade of the saw; B the slotted rod running up through the middle of the handle; C, the lower cylindrical portion of the handle; D the upper end of the handle; E, nut in the upper end of the handle; F, collar on the lower end of handle; G, sleeve between the parts C and D; *a* slot in the lower end of rod B; *b* screw thread on upper end of said rod.

I make the parts C and D of wood and bore them longitudinally for the reception of the rod B. The collar F serves the common purpose of preventing the splitting of the lower end of the handle, and as a bearing for the top edge of that part of the saw A, which is inserted in it. The sleeve F, keeps the two parts C, and D, together, and its upper edge serves as a bearing for the lower end of part D, the upper end of which carries the screw nut E, which works on the screw thread *b*, on the upper end of rod B. The slot *a* in the lower end of rod B is for the reception of the saw blade A.

To attach the handle to the saw slip the slotted rod over the blade and by turning the upper part, D, of the handle, the part C is forced down and tightly binds the blade between the collar F and the lower surface of the slot *a*. A reverse motion of the part D releases the blade.

The necessity for the removal of the handle arises from the fact that in cross cut sawing, especially in heavy timber, the kerf is apt to pinch together at top and prevent the retraction of the saw. It then becomes necessary to withdraw the saw longitudinally from the cut, to effect which the removal of the handle is requisite.

What I claim and desire to secure by Letters Patent, is—

The compound saw handle hereinbefore described, the same consisting of the combination of the slotted rod B, with the parts C, and D, of the handle, and the nut E, all constructed arranged, and operating as and for the purpose specified.

The above specification signed and witnessed this fourth day of February, A. D. 1860.

JACOB NEIMEYER.

Witnesses:
 ASA SHULER,
 YOUNG NOYANZA.